(12) United States Patent
Woodward, Jr. et al.

(10) Patent No.: US 12,536,015 B2
(45) Date of Patent: Jan. 27, 2026

(54) CODE MIGRATION AND DEPLOYMENT IN AN INTERNET-OF-THINGS (IOT) ENVIRONMENT

(71) Applicant: ROKU, INC., San Jose, CA (US)

(72) Inventors: Donald R. Woodward, Jr., Monte Sereno, CA (US); Patrick Brouillette, Tempe, AZ (US); Sasha Slijepcevic, Santa Barbara, CA (US)

(73) Assignee: Roku, Inc., San Jose, CA (US)

(*) Notice: Subject to any disclaimer, the term of this patent is extended or adjusted under 35 U.S.C. 154(b) by 239 days.

(21) Appl. No.: 18/234,153

(22) Filed: Aug. 15, 2023

(65) Prior Publication Data

US 2025/0060961 A1    Feb. 20, 2025

(51) Int. Cl.
| | |
|---|---|
| G06F 8/76 | (2018.01) |
| G06F 8/41 | (2018.01) |
| G06F 8/61 | (2018.01) |
| G06F 8/65 | (2018.01) |
| G06F 8/71 | (2018.01) |
| G06F 9/445 | (2018.01) |
| G06F 9/455 | (2018.01) |
| G06F 11/36 | (2025.01) |
| G06F 11/3698 | (2025.01) |

(52) U.S. Cl.
CPC .............. *G06F 8/76* (2013.01); *G06F 8/433* (2013.01); *G06F 8/61* (2013.01); *G06F 11/3698* (2025.01)

(58) Field of Classification Search
CPC ........ G06F 8/76; G06F 11/3698; G06F 8/433; G06F 8/61; G06F 8/65; G06F 8/30; G06F 8/51; G06F 8/70; G06F 8/72; G06F 11/3612; G06F 9/505; G06F 9/4856; G06F 9/5088; G06F 9/5011; G06F 9/5005; G06N 20/00
See application file for complete search history.

(56) References Cited

U.S. PATENT DOCUMENTS

| | | | |
|---|---|---|---|
| 10,853,049 B2 * | 12/2020 | Groseclose | G06F 8/65 |
| 12,079,625 B2 * | 9/2024 | Hoenzsch | G06F 8/60 |

* cited by examiner

*Primary Examiner* — Thuy Dao
(74) *Attorney, Agent, or Firm* — STERNE, KESSLER, GOLDSTEIN & FOX P.L.L.C.

(57) ABSTRACT

Disclosed herein are system, apparatus, article of manufacture, method, and/or computer program product embodiments, and/or combinations and sub-combinations thereof, for code migration and deployment in an Internet-of-Things (IoT) environment. A system server (e.g., a server of a cloud-based platform, etc.) may receive a codebase and operational information for a target device (e.g., an IoT device, a mobile device, a smart device, etc.). The codebase may be modified for compatibility with the target device based on functionality for libraries of the codebase mapped to functional elements that define the functional capabilities of the target device. A codebase migration window may be identified based on an indication that an operation of the target device satisfies an operational threshold and the operational information received from the target device. The modified codebase may be transferred to the target device during the codebase migration window.

20 Claims, 5 Drawing Sheets

CODE MIGRATION AND DEPLOYMENT IN AN INTERNET-OF-THINGS (IOT) ENVIRONMENT

BACKGROUND

Field

This disclosure is generally directed to code migration and deployment, and more particularly to managing code implemented on IoT devices.

Background

Within an Internet-of-Things (IoT) environment (e.g., a smart home, etc.), various IoT devices may be configured with various software. A business entity, service provider, and/or the like who intends to service the IoT devices may have limited or no options for updating or maintaining the software configured with the IoT devices. In situations where there is an ability to update or maintain software configured with the IoT devices, a business entity, service provider, and/or the like cannot identify the best time to push a software migration to the IoT devices to minimize disruptions to users of the target device and ensure a smooth transition.

SUMMARY

Provided herein are system, apparatus, article of manufacture, method, and/or computer program product embodiments, and/or combinations and sub-combinations thereof, for code migration and deployment in an Internet-of-Things (IoT) environment. A system server (e.g., a server of a cloud-based platform, etc.) may receive a codebase and operational information for a target device (e.g., an IoT device, a mobile device, a smart device, etc.). The codebase may be modified for compatibility with the target device based on functionality for libraries of the codebase mapped to functional elements that define the functional capabilities of the target device. A codebase migration window may be identified based on an indication that an operation of the target device satisfies an operational threshold and the operational information received from the target device. The modified codebase may be transferred to the target device during the codebase migration window.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
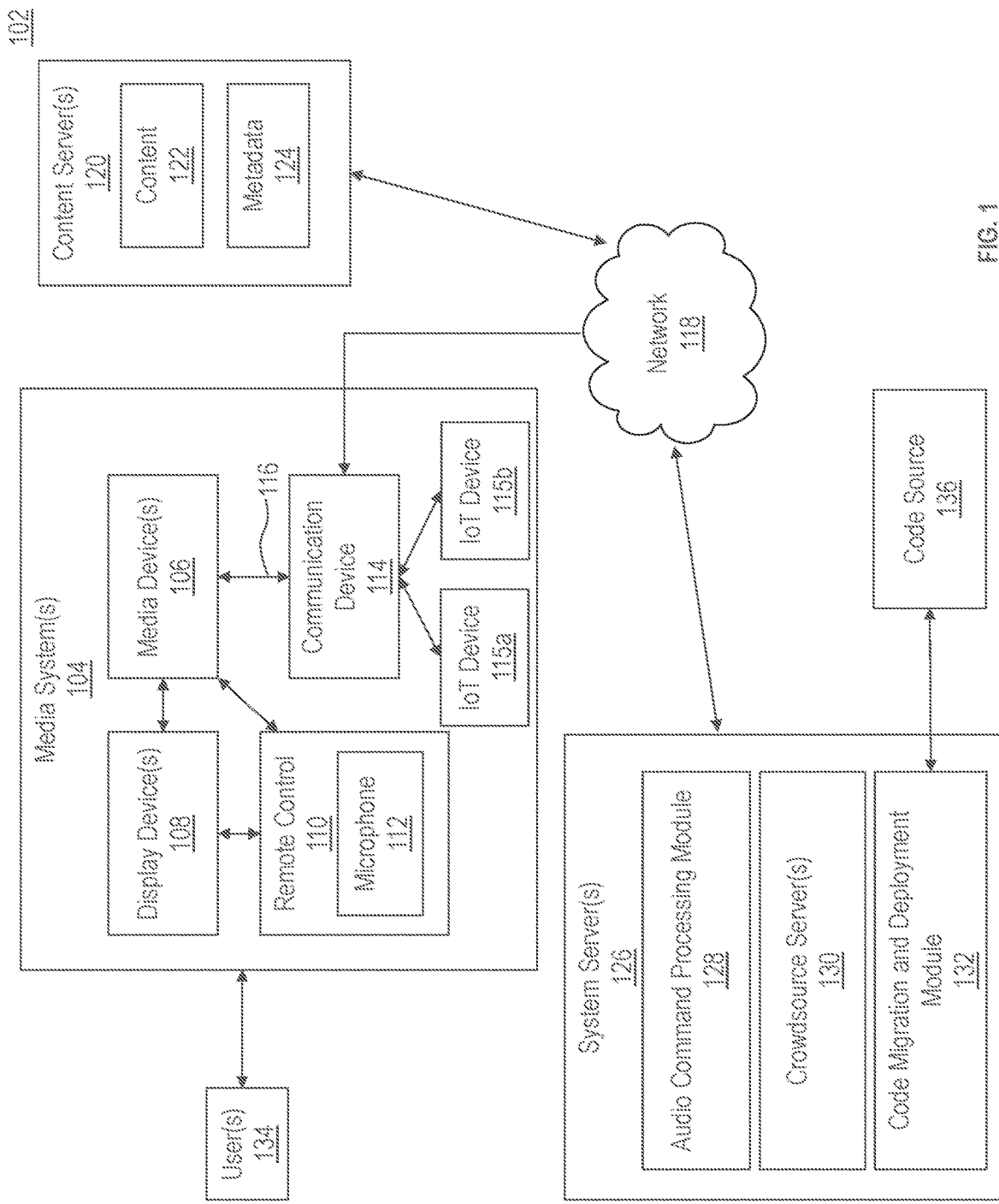
FIG. 1 illustrates a block diagram of a multimedia environment, according to some aspects of this disclosure.

Provided herein are system, apparatus, device, method, computer program product embodiments, and/or combinations and sub-combinations thereof, for code migration and deployment in an Internet-of-Things (IoT) environment. For example, in a scenario where a business entity, service provider, and/or the like prepares and/or participates in a plan, project, and/or undertaking to migrate target devices (e.g., IoT devices, mobile devices, smart devices, etc.) running first code (and/or operating according to a first codebase) to second code (e.g., entity-specific code, a modified or target codebase), a cloud-based system server(s) managed by the business entity, service provider, and/or the like may identify an optimal window for the migration. For example, the window for the migration may be an optimal timeframe during which migration of the second code to a target device takes place to minimize disruptions to users of the target device and ensure a smooth transition.

According to some aspects of this disclosure, an optimal window for migration may be identified and/or determined based on analysis of operational information received from a target device (and/or a device associated with the target device). According to some aspects of this disclosure, operational information may include, but is not limited to, telemetry data, performance metrics (e.g., CPU usage, memory utilization, network traffic, power consumption, etc.), an operational state, device usage data, environmental data, and/or any other relevant parameters that can indicate the behavior, the condition, and/or the like of the target device.

According to some aspects of this disclosure, prior to migrating code and/or a codebase to a target device, a cloud-based system server(s) managed by the business entity, service provider, and/or the like may save configurations (e.g., all configurations, specific configurations, necessary configurations, customized configurations, etc.) for and/or associated with the target device in a specified location/file. According to some aspects of this disclosure, the cloud-based system server(s) may create a cloud version of code and/or a codebase to be transferred to a target device and operate a replica of the target device from that cloud version. Based on operational information and/or behavior of the replica of the target device, the cloud-based system server(s) may verify that the cloud version runs/operates successfully on the replica of the target device before migrating the code and/or a codebase to the target device.

For example, with operational information collected from a target device (and/or a device associated with the target device), the cloud-based system server(s) may identify, determine, and/or forecast information about the target device, a user of the target device, a location where the target device is located, and/or the like to determine when to update the operating system of the target device with minimal disruption. For example, if the user is in the living room or is likely going to the living room soon—the cloud-based system server(s) may stall and/or halt an upgrade of the operating systems of devices in the living room until there is an indication that users of the devices in the living room are away or otherwise not using the devices. These and other technological advantages are described herein.

Various aspects of this disclosure may be implemented using and/or may be part of a multimedia environment 102 shown in FIG. 1. It is noted, however, that multimedia environment 102 is provided solely for illustrative purposes, and is not limiting. Aspects of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method, and/or process for distributing media.

According to some aspects of this disclosure, multimedia environment 102 may include one or more media systems 104. According to some aspects of this disclosure, media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. According to some aspects of this disclosure, user(s) 134 may interact with the media system 104 to query, select, and/or consume content items.

According to some aspects of this disclosure, each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

According to some aspects of this disclosure, the media device 106 may be a streaming media device, DVD or BLU-RAY device, audio/video playback device, cable box, and/or digital video recording device, to name just a few examples. Display device 108 may be a monitor, television (TV), computer, mobile device, smart device, tablet, wearable (such as a watch or glasses), appliance, internet of things (IoT) device, and/or projector, to name just a few examples. According to some aspects of this disclosure, media device 106 can be a part of, integrated with, operatively coupled to, and/or connected to its respective display device 108.

Figure 2:
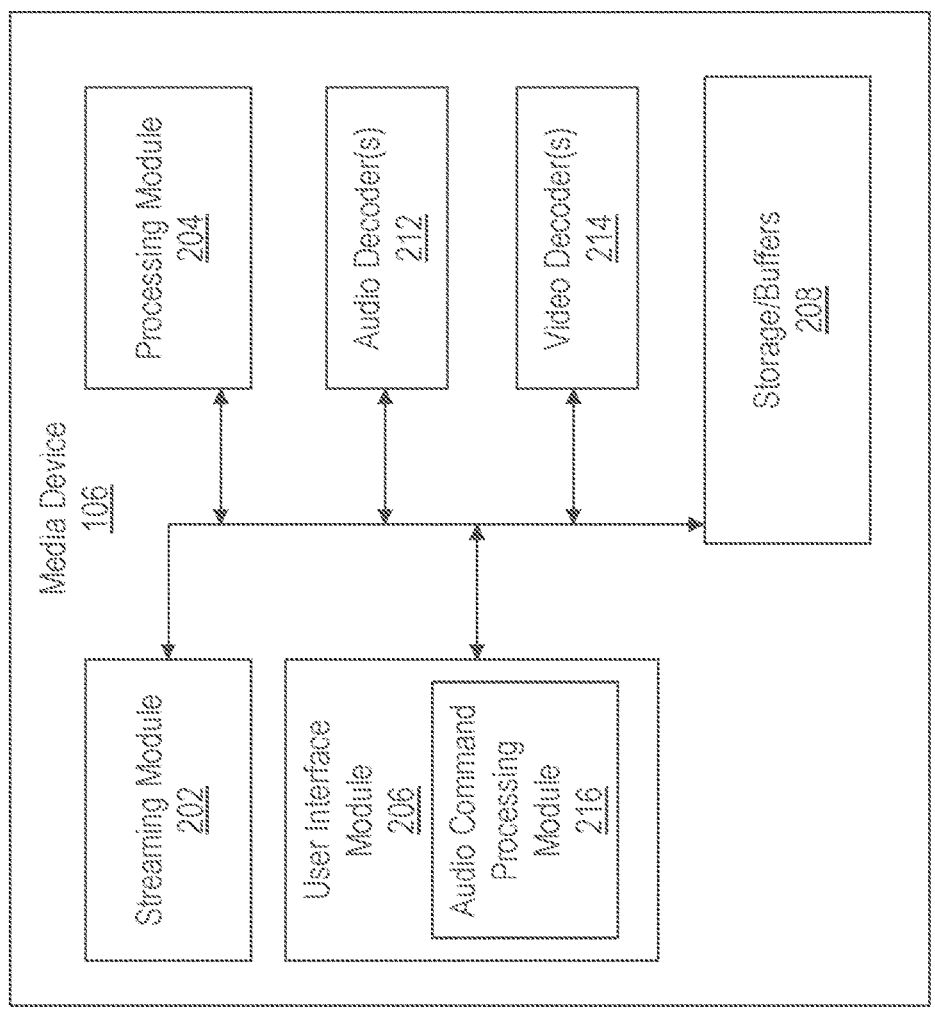
FIG. 2 illustrates a block diagram of a streaming media device, according to some aspects of this disclosure.

FIG. 2 illustrates a block diagram 200 of an example media device 106, according to some embodiments. Media device 106 may include a streaming module 202, processing module 204, storage/buffers 208, and a user interface module 206. The user interface module 206 may include an audio command processing module 216.

According to some aspects of this disclosure, the media device 106 may include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples. Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Returning to FIG. 1, each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as Wi-Fi) and/or wired connections.

According to some aspects of this disclosure, network 118 can include, without limitation, wired and/or wireless intranet, extranet, Internet, cellular, Bluetooth, infrared, and/or any other short-range, long-range, local, regional, global communications mechanism, means, approach, protocol and/or network, as well as any combination(s) thereof.

According to some aspects of this disclosure, media system 104 may include a remote control 110. The remote control 110 can be any component, part, apparatus, and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

According to some aspects of this disclosure, multimedia environment 102 may include a plurality of content servers 120 (also called content providers, channels, or content server(s) 120). Although only one content server 120 is shown in FIG. 1, in practice the multimedia environment 102 may include any number of content servers 120. Each content server 120 may be configured to communicate with network 118.

According to some aspects of this disclosure, each content server 120 may store content 122 and metadata 124. According to some aspects of this disclosure, content 122 may include advertisements, promotional content, commercials, and/or any advertisement-related content. According to some aspects of this disclosure, content 122 may include any combination of advertising supporting content including, but not limited to, content items (e.g. movies, episodic serials, documentaries, content, etc.), music, videos, movies, TV programs, multimedia, images, still pictures, text, graphics, gaming applications, ad campaigns, programming content, public service content, government content, local community content, software, and/or any other content and/or data objects in electronic form.

According to some aspects of this disclosure, metadata 124 comprises data about content 122. For example, metadata 124 may include associated or ancillary information indicating or related to a writer, director, producer, composer, artist, actor, summary, chapters, production, history, year, trailers, alternate versions, related content, applications, objects depicted in content items, object types, closed captioning data/information, audio description data/information, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

According to some aspects of this disclosure, multimedia environment 102 may include one or more system server(s) 126. The system server(s) 126 may operate to support the media devices 106 from the cloud. It is noted that the structural and functional aspects of the system server(s) 126 may wholly or partially exist in the same or different ones of the system server(s) 126.

According to some aspects of this disclosure, system server(s) 126 may include an audio command processing module 128. As noted above, the remote control 110 may include a microphone 112. The microphone 112 may receive audio data from users 134 (as well as other sources, such as the display device 108). According to some aspects of this disclosure, the media device 106 may be audio responsive, and the audio data may represent verbal commands from the user 134 to control the media device 106 as well as other components in the media system 104, such as the display device 108.

According to some aspects of this disclosure, the audio data received by the microphone 112 in the remote control 110 is transferred to the media device 106, which is then forwarded to the audio command processing module 128 in the system server(s) 126. The audio command processing module 128 may operate to process and analyze the received audio data to recognize user 134's verbal command. The audio command processing module 128 may then forward the verbal command back to the media device 106 for processing.

According to some aspects of this disclosure, the audio data may be alternatively or additionally processed and analyzed by an audio command processing module 216 in the media device 106 (see FIG. 2). Audio command processing module 216 may operate and/or perform functions similar to audio command processing module 128. The media device 106 and the system server(s) 126 may then cooperate to pick one of the verbal commands to process (either the verbal command recognized by the audio command processing module 128 in the system server(s) 126, or the verbal command recognized by the audio command processing module 216 in the media device 106).

Now referring to both FIGS. 1 and 2, in some embodiments, user 134 may interact with the media device 106 via, for example, the remote control 110. For example, user 134 may use the remote control 110 to interact with the user interface module 206 of the media device 106 to query/search and/or select content, such as a movie, TV show, music, book, application, game, etc. The streaming module 202 of the media device 106 may request the selected content from the content server(s) 120 over network 118. The content server(s) 120 may transmit the requested content to the streaming module 202. The media device 106 may transmit the received content to the display device 108 for playback to the user 134.

According to some aspects of this disclosure, the media system 104 may include devices and/or components supporting and/or facilitating linear television, inter-device/component communications (e.g., HDMI inputs connected to gaming devices, etc.), online communications (e.g., Internet browsing, etc.) and/or the like.

According to some aspects of this disclosure, for example, in streaming embodiments, the streaming module 202 may transmit the content to the display device 108 in real-time or near real-time as it receives such content from the content server(s) 120. In non-streaming embodiments, the media device 106 may store the content received from content server(s) 120 in storage/buffers 208 for later playback on display device 108.

According to some aspects of this disclosure, the media devices 106 may exist in thousands or millions of media systems 104. Accordingly, the media devices 106 may lend themselves to crowdsourcing embodiments, and, thus, the system server(s) 126 may include one or more crowdsource server(s) 130.

According to some aspects of this disclosure, using information received from the media devices 106 in the thousands and millions of media systems 104, the crowdsource server(s) 130 may identify similarities and overlaps between closed captioning requests issued by different users 134 watching a content item, advertisement, and/or the like. Based on such information, the crowdsource server(s) 130 may determine that turning closed captioning on may enhance users' viewing experience at particular portions of the content item, advertisement, and/or the like (for example, when the soundtrack of the content item, advertisement, and/or the like is difficult to hear), and turning closed captioning off may enhance users' viewing experience at other portions of the content item, advertisement, and/or the like (for example, when displaying closed captioning obstructs critical visual aspects of the content item, advertisement, and/or the like). Accordingly, the crowdsource server(s) 130 may operate to cause closed captioning to be automatically turned on and/or off during future streaming of the content item, advertisement, and/or the like.

According to some aspects of this disclosure, using information received from the media devices 106 (and/or user device(s) 103) in the thousands and millions of media systems 104, the crowdsource server(s) 130 may identify media devices (and/or user devices) to target with and/or acquire from bid stream data, communications, information, and/or the like. For example, the most popular content items may be determined based on the amount of content items are requested (e.g., viewed, accessed, etc.) by media devices 106.

According to some aspects of this disclosure, using information received from the media devices 106 in the thousands and millions of media systems 104, the crowdsource server(s) 130 may identify similarities and overlaps between closed captioning requests issued by different users 134 watching a particular movie. Based on such information, the crowdsource server(s) 130 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 130 may operate to cause closed captioning to be automatically turned on and/or off during future streaming of the movie.

According to some aspects of this disclosure, each media system 104 may include one or more IoT devices, such as IoT devices 115*a* and 115*b*. According to some aspects, IoT devices 115*a* and 115*b* may include devices that support, but are not limited to, home/location monitoring (e.g., cameras, speakers, sensors, video doorbells, etc.), lighting (e.g., smart bulbs, light strips, etc.), power (e.g., smart plugs, etc.), and/or the like. Although shown as IoT devices, according to some aspects, as described herein, IoT devices 115*a* and 115*b* may alternatively be or include mobile devices, computing devices, displays, content players, and/or the like.

According to some aspects of this disclosure, IoT devices 115a and 115b may support and/or include security capabilities including, but not limited to, two-factor authentication (2FA), user data encryption, secure boot, and other advanced protection settings. IoT devices 115a and 115b may receive automatic software updates and/or the like from system server(s) 126 (e.g., a code migration and deployment module 132, etc.) to ensure that IoT devices 115a and 115b are functional and up to speed. For example, as described herein, an optimal window for migration of code and/or codebases to IoT devices 115a and 115b may be identified and/or determined by system server(s) 126 based on analysis of operational information received from IoT device 115a, IoT device 115b, and/or the like. According to some aspects of this disclosure, operational information may include, but is not limited to, telemetry data, performance metrics (e.g., CPU usage, memory utilization, network traffic, power consumption, etc.), an operational state, device usage data, environmental data, and/or any other relevant parameters that can indicate the behavior, the condition, and/or the like of IoT devices 115a and 115b.

According to some aspects of this disclosure, the system server(s) 126 may include code migration and deployment module 132. In a scenario where a business entity, service provider, and/or the like prepares and/or participates in a plan, project, and/or undertaking to migrate target devices (e.g., IoT devices 115a and 115b, mobile devices, smart devices, etc.) running first code (and/or operating according to a first codebase) to second code (and/or a second codebase). Code migration and deployment module 132 may identify an optimal window for migration. For example, the window for the migration may be an optimal timeframe during which migration of the second code (and/or a second codebase) to a target device takes place to minimize disruptions to users (e.g., user(s) 134, etc.) of the target device and ensure a smooth transition.

According to some aspects of this disclosure, code migration and deployment module 132 may include one or more trained predictive models. For example, code migration and deployment module 132 may include one or more predictive models trained to forecast codebase migration windows for devices, trained to forecast codebase modifications for devices, and/or trained specifically to perform any required task for code migration and deployment within the multimedia environment 102.

According to some aspects of this disclosure, predictive models of code migration and deployment module 132 may be explicitly trained based on labeled datasets relating to, including, but not limited to: transforming first code (e.g., third-party code, a previous code, etc.) and/or a first codebase from a first format (e.g., a third-party specific format, a generic format, etc.) to a second format (e.g., a common format to be used among IoT devices associated with an entity, a business entity-specific format, a user-preferred format, etc.); forecasting codebase modifications for devices; forecasting codebase migration windows for devices; and/or the like. According to some aspects of this disclosure, predictive models of code migration and deployment module 132 may be trained on data derived from various IoT and other related devices within a media system 104. For example, code migration and deployment module 132 may include predictive models configured via a learning or training phase within a classifier constructor and task-specific feature selection module.

Code Migration and Deployment in an Internet-of-Things (IoT) Environment.

According to some aspects of this disclosure, system server(s) 126 (e.g. code migration and deployment module 132, etc.) operate to facilitate code migration and deployment in an Internet-of-Things (IoT) environment. A system server (e.g., a server of a cloud-based platform, etc.) may be controlled and/or operated by a business entity, service provider, and/or the like. The business entity, service provider, and/or the like may also provide IoT devices and/or the like to be implemented in various locations, such as the home location of a user. The IoT devices may be configured with and/or support a first codebase (e.g., third-party software, base/original software, a generic codebase, etc.). The business entity, service provider, and/or the like may want to implement a second codebase (e.g., proprietary software, an entity-specific codebase, a third-party codebase modified according to entity-specific and/or device-specific functionality, a modified version of a generic third-party codebase, a new entity-specific codebase, etc.) on the IoT devices. For example, in a scenario where an IoT device is a light bulb and/or the like, the lightbulb may be configured with a codebase that enables and/or supports basic functionality. A business entity, service provider, and/or the like may modify the codebase, and the modified codebase may enable new functionality for the lightbulb. For example, the lightbulb, based on the modified codebase may be used in synchronization with multiple lightbulbs to define a color profile. The modified codebase, now considered an entity-specific codebase, may be migrated to a plurality of lightbulbs to enable the new functionality. The business entity, service provider, and/or the like may use the system server to identify optimal times to migrate the second software (and/or a second codebase) to the IoT devices once the second software has been tested and operated on a target device (IoT device, etc.) has been verified.

Accordingly, the system server may receive operational information (e.g., telemetry data, performance metrics, environmental data, etc.) for a target device (e.g., an IoT device, a mobile device, a smart device, etc.) and use the operational information to determine an optimal codebase migration window. The first codebase may be modified and/or converted to a second codebase for compatibility with the target device based on functionality for libraries of the first codebase mapped to functional elements that define the functional capabilities of the target device. A codebase migration window may be identified based on an indication that an operation of the target device satisfies an operational threshold and the operational information received from the target device. The second codebase may be transferred to the target device during the codebase migration window.

Figure 3:
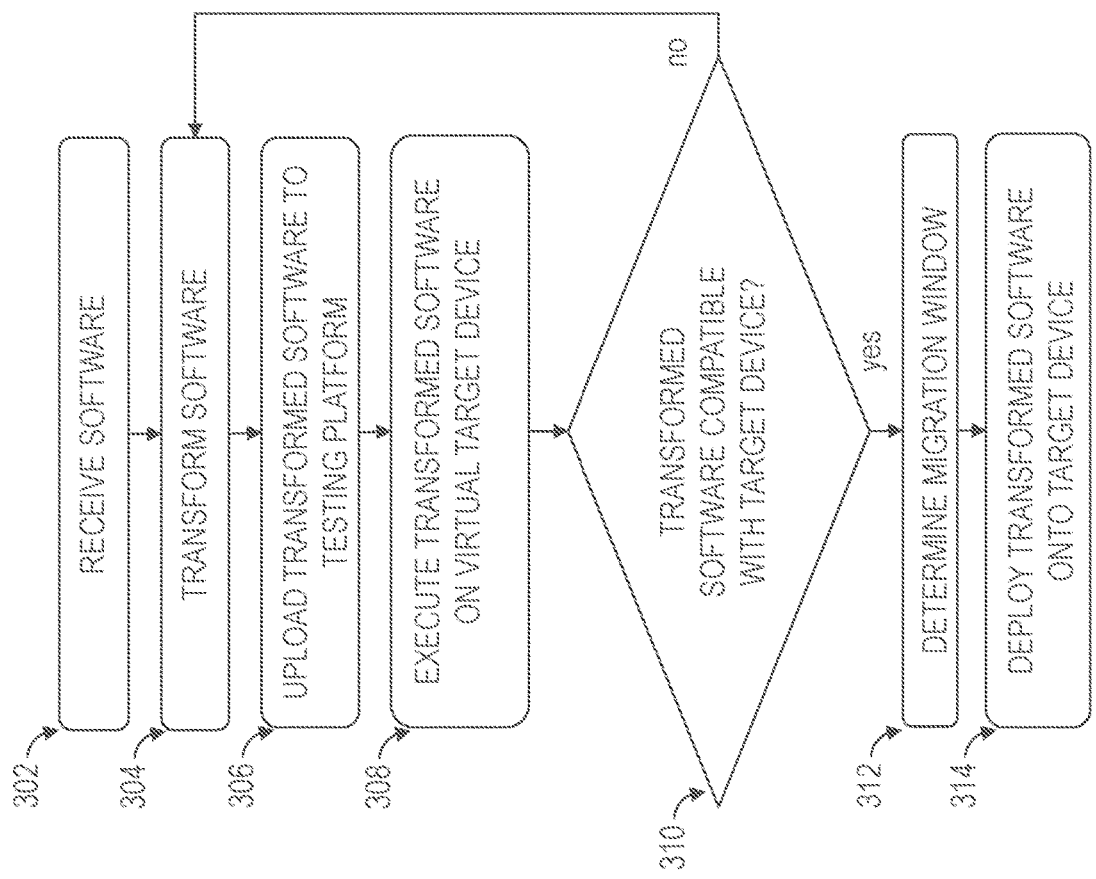
FIG. 3 illustrates a flowchart of an example method for code migration and deployment in an Internet-of-Things (IoT) environment, according to some aspects of this disclosure.

FIG. 3 shows a high-level flowchart of an example method for code migration and deployment in an Internet-of-Things (IoT) environment, according to some aspects of this disclosure. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIGS. 1-2. However, method 300 is not limited to the aspects of those figures.

In 302, system server(s) 126 receives software (e.g., code, codebase, etc.) from code source 136. According to some aspects of this disclosure, the software may be in a format associated with code source 136.

In 304, system server(s) 126 transforms the software into a common format. Transforming the software into the common format may include analyzing the structure and functionality of the software and converting it into a standardized format compatible with a target device and/or IoT environment;

In 306, system server(s) 126 uploads the transformed software to a cloud-based testing platform. According to some aspects of this disclosure, the cloud-based testing platform may include a device (e.g., target device, IoT device, etc.) emulator and be configured with software compatibility testing tools.

In 308, system server(s) 126 executes the transformed software within the virtualized device emulator in the cloud-based testing platform to simulate the operation of the transformed software on the target device. According to some aspects of this disclosure, the transformed software may be tested on a device that matches and/or operates the same as a target device.

According to some aspects of this disclosure, the execution of the transformed software may include validating the functionality, performance, and compatibility of the transformed software with the target device. According to some aspects of this disclosures, testing compatibility of the transformed software with the target device may be performed separate from execution of the transformed software on an emulator or a device that matches and/or operates the same as a target device.

In 310, system server(s) 126 generates compatibility information based on the results of the execution of the transformed software. The compatibility information may include information regarding the successful (or unsuccessful) execution and compatibility of the transformed software with the target device.

According to some aspects, if the compatibility information indicates any errors, failures, and/or the like occurring during testing within the testing platform, the process may restart at step 304. Particularly, fault analysis may be performed to trace and/or identify a cause of any errors, failures, and/or the like occurring during testing within the testing platform, and system server(s) 126 may again operate to transform the software into a common format before retesting.

In 312, system server(s) 126 determines an optimal migration window for the deployment of the transformed software onto the target device. To determine the optimal migration window, system server(s) 126 evaluates telemetry data (e.g., operational information) from the target device and/or surrounding devices (e.g., other IoT devices, etc.), network traffic, device usage patterns, user preferences, and/or the like.

In 314, system server(s) 126 deploys the transformed software onto the target device during the optimal migration window. Deployment may include transferring the transformed software from the cloud-based testing platform to the target device via a secure communication channel.

Returning to FIG. 1, the process of code migration and deployment in an Internet-of-Things (IoT) environment is explained in greater detail herein. According to some aspects of this disclosure, in an example scenario a business entity, service provider, and/or the like may prepare and/or participate in a plan, project, and/or the like to migrate target devices (e.g., IoT devices 115a and 115b, mobile devices, smart devices, etc.) running first code (and/or operating according to a first codebase) to second code (e.g., entity-specific code, a modified codebase, target code, etc.)

According to some aspects of this disclosure, before migrating a codebase to a target device, code migration and deployment module 132 may receive and save configurations (e.g., all configurations, specific configurations, necessary configurations, customized configurations, etc.) for and/or associated with the target device in a specified location/file. Code migration and deployment module 132 and/or users (e.g., developers, software engineers, etc.) of code migration and deployment module 132 may analyze the functionality and APIs (Application Programming Interfaces) associated with a codebase (e.g., codebase provided by code source 136, etc.). For example, the codebase may be parsed and analyzed for syntax, semantics, functional elements, and/or the like to identify required IoT and/or target device functionality.

According to some aspects of this disclosure, the specific functionality required for the IoT and/or target device functionality may be determined and/or identified. The process may consider any protocols, communication methods, data formats, and other IoT and/or target device-specific requirements. For example, code migration and deployment module 132 may parse technical documentation, firmware, and/or the like to identify what a target IoT device is meant to do. For example, in a scenario where IoT device 115a is a smart thermostat, code migration and deployment module 132 may determine features a codebase must enable and/or support for IoT device 115a to operate as intended. For example, the functional (and/or non-functional) requirements for IoT device 115a may be to enable IoT device 115a to communicate with system server(s) 126 (or any other device component of multimedia environment 102) by supporting different types of network connectivity (e.g., WiFi, Bluetooth, cellular, etc.), process user inputs, handle temperature data, and/or the like.

According to some aspects of this disclosure, with the functional (and/or non-functional) requirements for a target device identified, code migration and deployment module 132 then ensure any code and/or codebase received from code source 136 and/or the like supports and/or may be modified to support the functional (and/or non-functional) requirements for a target device. For example, code migration and deployment module 132 may use static code analysis to identify any programming errors/conflicts, ensure adherence to coding standards, identify security vulnerabilities, and determine other code quality metrics for any code and/or codebase received from code source 136 and/or the like. Code migration and deployment module 132 may use execute unit tests to evaluate individual pieces of any code and/or codebase received from code source 136 and/or the like in isolation and verify that specific functions of the code and/or codebase operate as expected. Code migration and deployment module 132 may use execute integration tests to evaluate how different parts of any code and/or codebase received from code source 136 and/or the like work together.

According to some aspects of this disclosure, code migration and deployment module 132 may evaluate the available libraries of any code and/or codebase received from code source 136 and/or the like that support a target device to ensure that the libraries provide or may be modified to provide the required functionalities for a target device identified by the code migration and deployment module 132. According to some aspects of this disclosure, code migration and deployment module 132 may compare the functionalities provided by any code and/or codebase received from code source 136 and/or the like with target device libraries to identify similar or equivalent functionalities between the two.

According to some aspects of this disclosure, code migration and deployment module 132 may generate transformation logic between any code and/or codebase received from code source 136 and target device (e.g., IoT device 115a and 115b, etc.) libraries. For example, based on the functional mapping analysis, code migration and deployment module 132 may generate transformation code to transform the usage of functions from code and/or codebase received from code source 136 to equivalent library functions for the target device (e.g., IoT device 115a and 115b, etc.). According to some aspects of this disclosure, code migration and deployment module 132 may consider any dependencies or additional libraries for code and/or codebase received from code source 136 before transforming the code and/or codebase to be suitable for a target device.

As previously described herein, according to some aspects of this disclosure, code migration and deployment module 132 may include one or more trained predictive models. For example, code migration and deployment module 132 may include one or more predictive models trained to forecast codebase modifications for devices. For example, a trained predictive model may be used to generate transformation logic between any code and/or codebase received from code source 136 and a target device. By incorporating a predictive model for such task, code migration and deployment module 132 may recommend libraries of code and/or codebase received from code source 136 or utilities from the code and/or codebase that support operational settings/configuration for the target device to be included in transformation logic that may support enhanced, new, and/or future functionality for the target device.

According to some aspects of this disclosure, code migration and deployment module 132 may use a predictive model and/or the like to adapt function calls, identify and handle data format conversions, and/or otherwise ensure compatibility between the libraries of a code and/or codebase and a target device. Code migration and deployment module 132 may refine any transformation logic as needed.

According to some aspects of this disclosure, code migration and deployment module 132 may apply the transformation logic to the code and/or codebase received from code source 136. According to some aspects of this disclosure, to test a transformed/modified code and/or codebase code to ensure suitability and/or operability on a target device, code migration and deployment module 132 may create a cloud version of code and/or a codebase and operate a replica of the target device from that cloud version. Based on operational information and/or behavior of the replica of the target device identified during testing, code migration and deployment module 132 may verify that the cloud version runs/operates successfully on the replica of the target device before migrating the code and/or a codebase to the target device.

Code migration and deployment module 132 may identify an optimal window for migration. For example, the window for the migration may be an optimal timeframe during which migration of the entity-specific code (and/or a modified codebase) to a target device takes place to minimize disruptions to users of the target device and ensure a smooth transition.

According to some aspects of this disclosure, an optimal window for migration may be identified and/or determined based on analysis of operational information received from a target device (and/or a device associated with the target device). According to some aspects of this disclosure, operational information may include, but is not limited to, telemetry data, performance metrics (e.g., CPU usage, memory utilization, network traffic, power consumption, etc.), an operational state, device usage data, environmental data, and/or any other relevant parameters that can indicate the behavior, the condition, and/or the like of the target device.

For example, with operational information collected from a target device (and/or a device associated with the target device), code migration and deployment module 132 may identify, determine, and/or forecast information about the target device, a user of the target device, a location where the target device is located, and/or the like to determine when to update the operating system of the target device with minimal disruption. For example, if the user is in the living room or is likely going to the living room soon-code migration and deployment module 132 may stall and/or halt an upgrade of the operating systems of a target device (e.g., IoT device 115a, etc.) in the living room until there is an indication that users of the target device in the living room are away or otherwise not using the target device.

According to some aspects of this disclosure, code migration and deployment module 132 may include one or more predictive models trained to forecast codebase migration windows for devices. For example, a predictive model may forecast an optimal codebase migration window for a target device (e.g., IoT device 115a, etc.) using operational information from the target device itself and other devices (e.g., IoT device 115b, etc.) in proximity to the target device. As previously described herein, operational information may include, but is not limited to, telemetry data, performance metrics (e.g., CPU usage, memory utilization, network traffic, power consumption, etc.), an operational state, device usage data, environmental data, and/or any other relevant parameters that can indicate the behavior, the condition, and/or the like of the target device. The predictive model may consider ancillary data such as the objectives of a migration plan, such as minimizing downtime, maximizing performance, or reducing energy consumption. The predictive model may recommend and/or monitor key performance indicators (KPIs) that may be used to evaluate the success of the migration.

According to some aspects of this disclosure, a predictive model of code migration and deployment module 132 may also collect proximity data. For example, the predictive model may also collect sensor data, operational information, and/or any other information that may indicate a condition of the environment in which the target device is located. For example, in an IoT environment, the predictive model may collect data from other IoT devices in the vicinity of the target device. This data can provide the predictive model details regarding the environment (e.g., is a user of the target device in a room where the target device is located or is likely to return to the room soon, etc.), potential interference, or resource availability that may affect the migration process.

According to some aspects of this disclosure, code migration and deployment module 132 may analyze the collected operational data and/or proximity data and extract relevant features that can be used to forecast an optimal migration window. For example, patterns or anomalies may be identified in the collected operational data and/or proximity data that correlate with successful or unsuccessful migrations in the past. Code migration and deployment module 132 may use statistical modeling techniques to develop features to train the predictive model using historical operational data and/or proximity data associated with migration outcomes. The predictive model may learn patterns and relationships between the operational data and/or proximity data and the success or failure of previous migrations.

According to some aspects of this disclosure, a predictive model of code migration and deployment module 132 may incorporate any proximity data (e.g., information that indicates that a user is using a target device, information that indicates a state of a target device, etc.) into its forecasting of migration windows and/or migration opportunities to provide additional context and help identify potential dependencies or interference that may impact the migration windows and/or migration opportunities.

A trained predictive model may analyze current and/or real-time telemetry data for the target IoT device and nearby devices to forecast an optimal migration window. The trained predictive model may provide a predicted timeframe that aligns with the defined migration goals and KPIs. According to some aspects of this disclosure, the accuracy and reliability of the predictive model may be evaluated by comparing its forecasts with actual migration outcomes. The predictive model may be continuously refined by incorporating new data and iteratively improving its performance.

Figure 4:
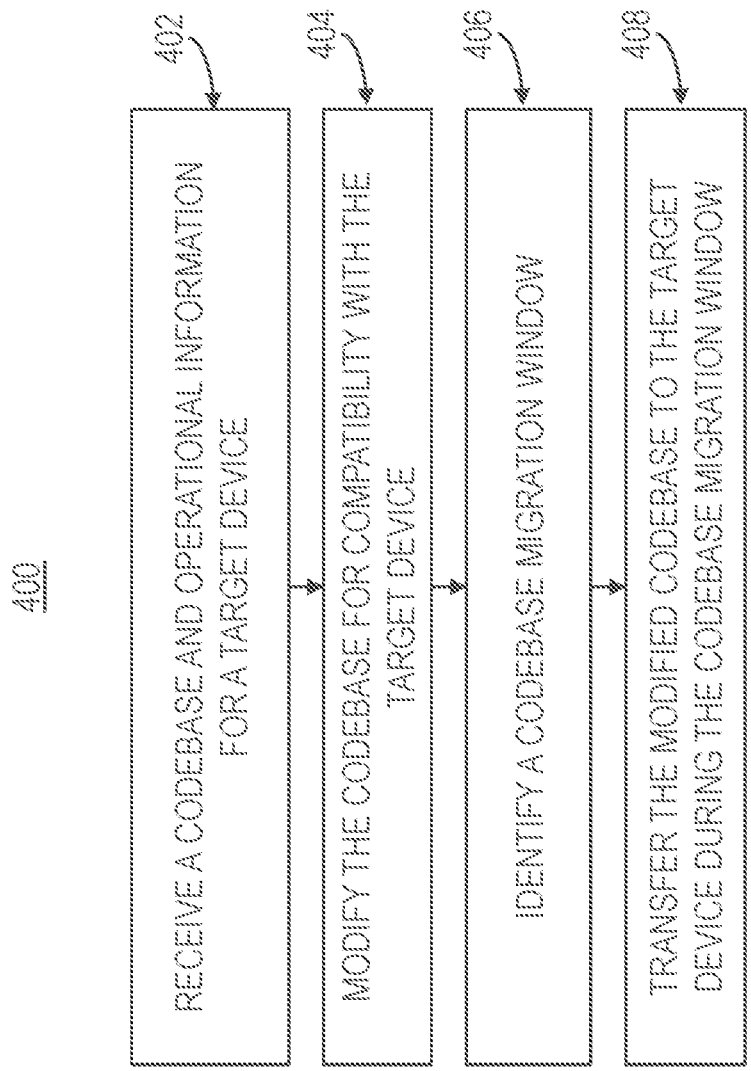
FIG. 4 illustrates a flowchart of an example method for code migration and deployment in an Internet-of-Things (IoT) environment, according to some aspects of this disclosure.

FIG. 4 shows a flowchart of an example method 400 for code migration and deployment in an IoT environment, according to some aspects of this disclosure. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1-2. However, method 400 is not limited to the aspects of those figures. A computer-based system (e.g., the system server(s) 126, etc.) may facilitate code migration and deployment in an IoT environment.

In 402, system server(s) 126 receives a codebase and operational information for a target device (e.g., IoT device 115a, IoT device 115b, a mobile device, a smart device, etc.). According to some aspects of this disclosure, system server(s) 126 receives the codebase from a code source (e.g., code source 136, a software provider, a device manufacturer, a third-party code source, etc.). For example, system server(s) 126 may receive the codebase from the code source as part of a plan, project, and/or undertaking to migrate target devices running the codebase with an entity-specific and/or modified codebase. According to some aspects of this disclosure, the operational information may include, but is not limited to, telemetry data, performance metrics (e.g., CPU usage, memory utilization, network traffic, power consumption, etc.), an operational state, device usage data, environmental data, and/or any other relevant parameters that can indicate the behavior, the condition, and/or the like of the target device.

In 404, system server(s) 126 modifies the codebase for compatibility with the target device According to some aspects of this disclosure, the codebase may be modified based at least in part on respective functionality for each library of a plurality of libraries of the codebase being mapped to respective functional elements (e.g., configuration information, device specifications, firmware, settings, parameters, etc.) of a plurality of functional elements that define functional capabilities of the target device.

According to some aspects of this disclosure, system server(s) 126 may determine a dependency between a library of the plurality of libraries and an additional library of the codebase, configuration information for the codebase that corresponds to configuration information for the target device, and/or the like. For example, system server(s) 126 may determine a dependency between a library of the plurality of libraries and an additional library of the codebase, configuration information for the codebase that corresponds to configuration information for the target device, and/or the like based on metadata of the codebase. According to some aspects of this disclosure, system server(s) 126 may modify the additional library and/or the configuration information for the codebase for compatibility with the target device. For example, the modified codebase may also include the modified additional library and/or the modified configuration information for the codebase.

In 406, system server(s) 126 identifies a codebase migration window. According to some aspects of this disclosure, system server(s) 126 identifies the codebase migration window based on the operational information and responsive to an indication that an operation of the target device satisfies an operational threshold for the target device. According to some aspects of this disclosure, system server(s) 126 identifies the codebase migration window by receiving an indication of the codebase migration window from a predictive model. According to some aspects of this disclosure, the predictive model may be trained to forecast codebase migration windows for devices. For example, the operational information for the target device may be input into the predictive model, and the predictive model may identify an operational usage pattern, operational constraints, and/or the like that may be used to forecast the codebase migration window. For example, the codebase migration window may be an optimal timeframe during which migration of the modified codebase to the target device takes place to minimize disruptions to users of the target device and ensure a smooth transition.

According to some aspects of this disclosure, the indication that the operation of the target device executed via the modified codebase satisfies the operational threshold may be generated and/or received by system server(s) 126 based on the modified codebase executed on a replica of the target device.

For example, according to some aspects of this disclosure, the replica of the target device may be a device of the same configuration, make, model, design, and/or the like as the target device. The modified codebase may be executed and/or tested on the replica device in a development and/or testing environment, and results from the execution and/or testing may be provided to and/or generated by system server(s) 126.

According to some aspects of this disclosure, the replica of the target device may be a virtual instance (e.g., virtual machine, etc.), an emulation, and/or the like of the target device. The modified codebase may be executed and/or tested (e.g., using simulation tools, etc.) on the replica device in a virtual environment, and results from the execution and/or testing may be provided to and/or generated by system server(s) 126.

In 408, system server(s) 126 transfers the modified codebase to the target device (and/or target devices) during the codebase migration window. According to some aspects of this disclosure, transferring the modified codebase to the target device during the codebase migration window may include transferring the modified codebase to a device (e.g., a mobile device, an IoT device, an access point, a network terminal, etc.) in proximity to the target device. The device in proximity to the target device may send a notification to the target device that informs the target device that the modified codebase is ready for download. The target device may download and/or receive the modified codebase from the device in proximity to the target device at a time convenient for the target device, such as a time during low/no usage of the target device, a time when adequate bandwidth to download and/or receive the modified codebase is available, and/or the like. The target device may utilize various communication techniques including, but not limited to, WiFi, Bluetooth, NFC, infrared, ultra-wideband, and/or the like to download and/or receive the modified codebase from the device in proximity to the target device at a time convenient for the target device.

According to some aspects of this disclosure, transferring the modified codebase to the target device during the codebase migration window may include sending the modified codebase to the target device based on an indication from a device in proximity to the target device that a user of the target device is not in the proximity of the target device, the target device is in an idle state, and/or the like.

Example Computer System

Figure 5:
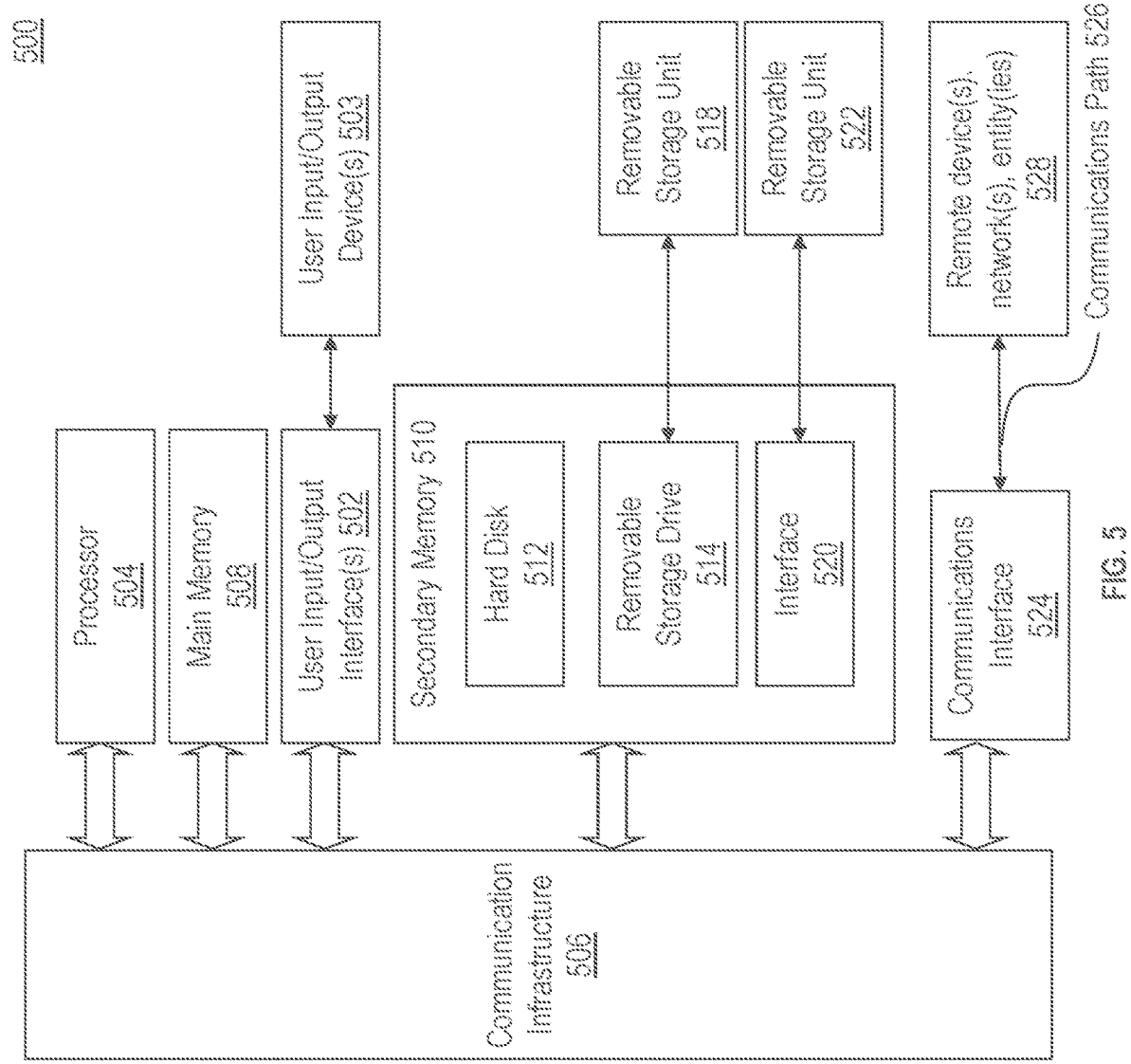
FIG. 5 illustrates an example computer system useful for implementing various aspects of this disclosure.

Various embodiments may be implemented, for example, using one or more well-known computer systems, such as computer system 500 shown in FIG. 5. For example, the media device 106 may be implemented using combinations or sub-combinations of computer system 500. Also or alternatively, one or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for code migration and deployment in an Internet-of-Things (IoT) environment, comprising:
   receiving, by at least one computer processor, a codebase and operational information for a target device;
   modifying, based at least in part on respective functionality for each library of a plurality of libraries of the codebase mapped to respective functional elements of a plurality of functional elements that define functional capabilities of the target device, the codebase for compatibility with the target device;
   identifying, based on the operational information and responsive to an indication that an operation of the target device satisfies an operational threshold for the target device, a codebase migration window; and
   transferring the modified codebase to the target device during the codebase migration window.

2. The computer-implemented method of claim 1, further comprising:
   determining, based on metadata of the codebase, at least one of: a dependency between a library of the plurality of libraries and an additional library of the codebase, or configuration information for the codebase that corresponds to configuration information for the target device; and
   modifying at least one of the additional library or the configuration information for the codebase for compatibility with the target device, wherein the modified codebase comprises at least one of the modified additional library or the modified configuration information for the codebase.

3. The computer-implemented method of claim 1, further comprising generating, based on the modified codebase executed on a replica of the target device, the indication that the operation of the target device executed via the modified codebase satisfies the operational threshold.

4. The computer-implemented method of claim 1, further comprising receiving, based on the codebase and the operational information for the target device input into a predictive model trained to forecast codebase modifications for devices, a recommendation from the predictive model for at least one of an additional library of the codebase or an operational setting configuration for the target device, wherein the modified codebase comprises at least one of the additional library of the codebase or the operational setting configuration.

5. The computer-implemented method of claim 1, wherein the identifying the codebase migration window further comprises receiving, based on the operational information for the target device input into a predictive model trained to forecast codebase migration windows for devices, an indication of the codebase migration window.

6. The computer-implemented method of claim 1, wherein the transferring the modified codebase to the target device during the codebase migration window comprises transferring the modified codebase to a device in proximity to the target device, wherein the device is configured to send the modified codebase to the target device.

7. The computer-implemented method of claim 1, wherein the transferring the modified codebase to the target device during the codebase migration window comprises sending the modified codebase to the target device based on an indication from a device in proximity to the target device that at least one of: a user of the target device is not in the proximity of the target device, or the target device is in an idle state.

8. A system, comprising:
one or more memories; and
at least one processor each coupled to at least one of the one or more memories and configured to perform operations for code migration and deployment in an Internet-of-Things (IoT) environment, the operations comprising:
receiving a codebase and operational information for a target device;
modifying, based at least in part on respective functionality for each library of a plurality of libraries of the codebase mapped to respective functional elements of a plurality of functional elements that define functional capabilities of the target device, the codebase for compatibility with the target device;
identifying, based on the operational information and responsive to an indication that an operation of the target device satisfies an operational threshold for the target device, a codebase migration window; and
transferring the modified codebase to the target device during the codebase migration window.

9. The system of claim 8, the operations further comprising:
determining, based on metadata of the codebase, at least one of: a dependency between a library of the plurality of libraries and an additional library of the codebase, or configuration information for the codebase that corresponds to configuration information for the target device; and
modifying at least one of the additional library or the configuration information for the codebase for compatibility with the target device, wherein the modified codebase comprises at least one of the modified additional library or the modified configuration information for the codebase.

10. The system of claim 8, the operations further comprising generating, based on the modified codebase executed on a replica of the target device, the indication that the operation of the target device executed via the modified codebase satisfies the operational threshold.

11. The system of claim 8, the operations further comprising receiving, based on the codebase and the operational information for the target device input into a predictive model trained to forecast codebase modifications for devices, a recommendation from the predictive model for at least one of an additional library of the codebase or an operational setting configuration for the target device, wherein the modified codebase comprises at least one of the additional library of the codebase or the operational setting configuration.

12. The system of claim 8, wherein the identifying the codebase migration window further comprises receiving, based on the operational information for the target device input into a predictive model trained to forecast codebase migration windows for devices, an indication of the codebase migration window.

13. The system of claim 8, wherein the transferring the modified codebase to the target device during the codebase migration window comprises transferring the modified codebase to a device in proximity to the target device, wherein the device is configured to send the modified codebase to the target device.

14. The system of claim 8, wherein the transferring the modified codebase to the target device during the codebase migration window comprises sending the modified codebase to the target device based on an indication from a device in proximity to the target device that at least one of: a user of the target device is not in the proximity of the target device, or the target device is in an idle state.

15. A non-transitory computer-readable medium having instructions stored thereon that, when executed by at least one computing device, cause the at least one computing device to perform operations for code migration and deployment in an Internet-of-Things (IoT) environment, the operations comprising:
receiving a codebase and operational information for a target device;
modifying, based at least in part on respective functionality for each library of a plurality of libraries of the codebase mapped to respective functional elements of a plurality of functional elements that define functional capabilities of the target device, the codebase for compatibility with the target device;
identifying, based on the operational information and responsive to an indication that an operation of the target device satisfies an operational threshold for the target device, a codebase migration window; and
transferring the modified codebase to the target device during the codebase migration window.

16. The non-transitory computer-readable medium of claim 15, the operations further comprising:
determining, based on metadata of the codebase, at least one of: a dependency between a library of the plurality of libraries and an additional library of the codebase, or configuration information for the codebase that corresponds to configuration information for the target device; and
modifying at least one of the additional library or the configuration information for the codebase for compatibility with the target device, wherein the modified codebase comprises at least one of the modified additional library or the modified configuration information for the codebase.

17. The non-transitory computer-readable medium of claim 15, the operations further comprising generating, based on the modified codebase executed on a replica of the target device, the indication that the operation of the target device executed via the modified codebase satisfies the operational threshold.

18. The non-transitory computer-readable medium of claim 15, the operations further comprising receiving, based on the codebase and the operational information for the target device input into a predictive model trained to forecast codebase modifications for devices, a recommendation from the predictive model for at least one of an additional library of the codebase or an operational setting configuration for the target device, wherein the modified codebase comprises at least one of the additional library of the codebase or the operational setting configuration.

19. The non-transitory computer-readable medium of claim 15, wherein the identifying the codebase migration window further comprises receiving, based on the operational information for the target device input into a predictive model trained to forecast codebase migration windows for devices, an indication of the codebase migration window.

20. The non-transitory computer-readable medium of claim 15, wherein the transferring the modified codebase to the target device during the codebase migration window comprises transferring the modified codebase to a device in proximity to the target device, wherein the device is configured to send the modified codebase to the target device.

* * * * *